United States Patent [19]
Sondermann et al.

[11] Patent Number: 5,448,764
[45] Date of Patent: Sep. 5, 1995

[54] CORDLESS TELEPHONE SET WITH SECURE COMMUNICATION PROTOCOL

[75] Inventors: Manfred Sondermann, Nürnberg; Erwin Kosmann, Schwabach; Georg Ranner, Lauf, all of Germany

[73] Assignee: U.S. Philips Corporation, New York, N.Y.

[21] Appl. No.: 29,254

[22] Filed: Oct. 10, 1993

[30] Foreign Application Priority Data

Jun. 8, 1989 [DE] Germany ............ 39 18 697.0
Mar. 11, 1992 [DE] Germany ............ 42 07 776.1

[51] Int. Cl.⁶ ............................ H04M 11/00
[52] U.S. Cl. ........................ 455/88; 455/89; 379/62
[58] Field of Search .......... 455/69, 88, 89, 38.1; 379/61, 62, 95; 340/825.31, 825.32, 825.34

[56] References Cited

U.S. PATENT DOCUMENTS 5,239,294 8/1993 Flanders et al. .............. 379/62
5,303,285 4/1994 Kerihuel et al. .............. 379/62

FOREIGN PATENT DOCUMENTS 0304998 8/1988 European Pat. Off. .
3918697 12/1990 Germany .

Primary Examiner—Reinhard J. Eisenzopf
Assistant Examiner—Andrew Faile
Attorney, Agent, or Firm—Anne E. Barschall

[57] ABSTRACT

In cordless telephone sets comprising at least one base station and at least one handset, an exchange of identification codes takes place between the base station and the handset. In order to realise greater flexibility with cordless telephone sets, the invention proposes to establish a connection between the handset and the base station also by means of a second identification code stored in the base station. In this manner, any user without knowing the identification codes to be exchanged between the handset and the base station can sign on and sign off a handset at any compatible base station, provided that he knows the second identification code.

10 Claims, 3 Drawing Sheets

CORDLESS TELEPHONE SET WITH SECURE COMMUNICATION PROTOCOL

DESCRIPTION

This application is related to application Ser. No. 07/921,956, filed Jul. 29, 1992.

The invention relates to a telecommunication system in which at least one base station can communicate with at least one handset by a radio link, an exchange of identification codes taking place between the base station and the handset.

With cordless telephone sets the frequencies of the radio channels between base station and handsets of the cordless telephone sets are standardized. The cordless telephone sets may optionally access the standardized radio frequencies. However, an access to the same radio channel is then certainly to be avoided for a handset and a base station not allocated to each other.

For example, DE-OS 39 18 697.0 discloses an exchange of identification codes between a base station and a handset for avoiding, by way of such a code exchange, a connection being established between a handset and a base station not allocated to each other. The element receiving an identification code verifies the received code with a stored identification code and terminates the connection when the two identification codes do not match. That document has further disclosed that an identification code issued only once is stored already during the manufacturing process in a read-only memory of the base station and in a read-only memory of the handset of each telephone set comprising a base station and a handset.

Furthermore, for example, EP 03 04 998 A2 has also disclosed cordless telephone sets in which such an identification code is produced in the base station as a random number and is transmitted to a handset when the latter is charged in the base station.

It is an object of the present invention to realise greater flexibility in a cordless telephone set of the type mentioned in the opening paragraph.

This object is achieved in that a connection is also set up between a handset and a base station with the aid of a second identification code stored in the base station.

In all prior-art cordless telephone sets which have a safety check for avoiding accesses by non-allocated base stations or handsets, a mobile unit is capable of setting up a radio connection to a specific base station only when it transmits to the base station the identification code somehow agreed upon in common. With the solution proposed it is also possible with the second identification code stored in the base station to set up a connection for data exchange. Each user who knows the second code may enter this code by means of a handset compatible with the base station. In this manner any user of such a handset can sign on at any base station that may be selected at random by the user, provided that he knows the second identification code of the base station.

The base station, recognizing a correspondence between the identification code transmitted by the radio channel and its own second identification code stored in the base station, then transmits the first identification code stored in the base station to the handset that signs on. The handset stores the received first identification code of the base station in an overwritable memory. This terminates the sign-on procedure. For a further data exchange between the base station and the signed-on handset, for example, a conversation set up between the base station and the signed-on handset, only the first identification code is used thenceforth. This is advantageous in that protection against manipulations is extensively provided because the first identification word remains concealed from everybody.

In a further embodiment of the invention a changeable identification code is provided. This changeable identification code may be, for example, a personal identification number which may be changed at will by the user of a cordless telephone set. This identification code can thus be kept secret to everybody.

In a further embodiment of the invention a connection set-up without the first identification code is only performed when the second identification code and the changeable identification code are co-transmitted. This embodiment is advantageous in that the signing on of a mobile station by an unauthorized user is avoided with the largest possible degree of reliability.

During the manufacturing process, the second identification code for each base station can be issued only once, so that an accidental signing on of an adjacent base station is avoided, whereas in the case of an exchange of personal identification numbers users of adjacent base stations might accidentally dial the same personal identification number. On the other hand, the additional personal identification number ensures that a user who happens to be familiar with a second identification code cannot sign on a compatible handset at the base station of another user.

The reliability is further enhanced in that after a specific number of sign-on attempts by a handset with a changeable identification code that does not match the changeable identification code stored in the base station, the handset is switched to a state in which entries are no longer possible. In an embodiment in which the handset can only be reset by a service engineer, the temptation to manipulate is considerably reduced due to the attendant cost of resetting a blocked handset.

In a further embodiment a handset number which can be dialled by the user can be transmitted to the base station when the handset signs on. This embodiment is specifically suitable for private branch exchanges constituted by cordless telephone sets, in which a plurality of cordless telephone sets are handled by a single base station. On the basis of the handset number which is also stored in the handset, the associated handset may be addressed selectively. In the case of telephone exchanges constituted by cordless telephone sets, a simple enlargement of the numbers of subscribers that can be handled by the telephone exchange may thus be provided by the subscribers themselves.

The option of handsets signing on and signing off is advantageous in that each handset may be allocated to an arbitrary base station. For example, it is possible to use a handset both at home and at the office. In this manner the purchasing costs may be reduced to the actually necessary number of handsets.

Since the signing on and signing off of the handsets is effected via the handsets themselves, it is also possible to effect a signing on or signing off when there is no direct access to the base station. This might be important, for example, when the base station is located in a closed space.

BRIEF DESCRIPTION OF THE DRAWING

The present invention will now be described, by way of example, with reference to the accompanying drawings, wherein.

Throughout the figures the same reference numerals are used for the same features.

DETAILED DESCRIPTION OF THE PREFERRED EMBODIMENTS

Figure 1:
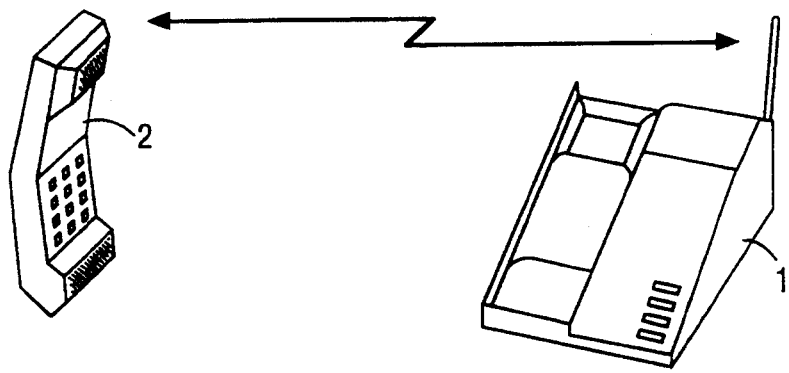
FIG. 1 shows a cordless telephone set.

FIG. 1 shows an exemplary embodiment of a cordless telephone set including a base unit (or station) 1 and a mobile unit (or handset) 2, which is provided with a keypad 3 for entering information. The keypad 3 has at least keys labelled 0–9, "*", and "SET". The base unit 1 is connected to a communication line. In order to hold a conversation between mobile unit 2 and the base station 1, a duplex radio link is to be established between the two units.

Figure 2:
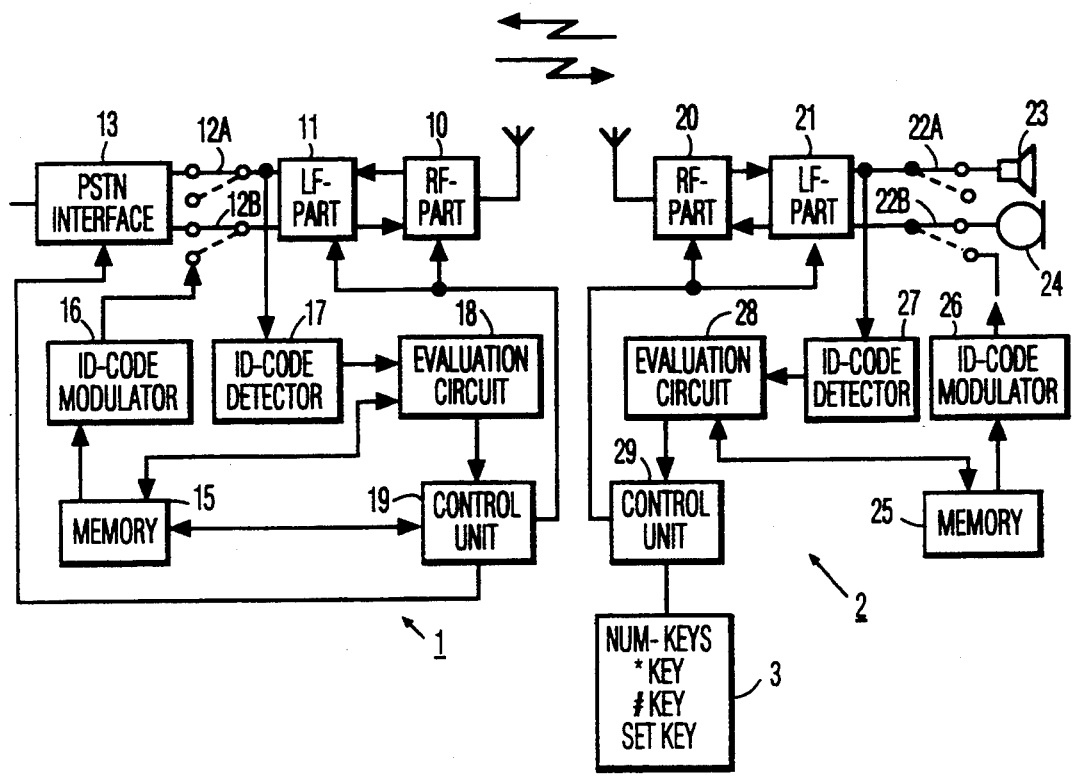
FIG. 2 shows a block diagram of a cordless telephone set.

FIG. 2 shows in a diagrammatic representation, in the left half, the block diagram of the base unit 1 and, in the right half, the block diagram of the mobile unit 2. By means of an exchange interface module 13, the base unit is connected to a communication network. The exchange interface module 13 performs all adaptations as regards transmission and switching technology between an internal four-wire interface and the two-wire connection to the communication network. The exchange interface further generates the pulses (if the pulse dialling method is implemented) or frequencies (if the multifrequency dialling method is implemented) necessary for dialling another subscriber. For this purpose, the exchange interface module 13 is accordingly driven by a central control circuit 19 of the base unit. In the case of an incoming call, the exchange interface module 13 generates a signal which is applied to the central control circuit 19.

With an existing telephone connection, the incoming telephone signal is applied to an HF section 10 of the base unit 1 via an AF section 11. In an HF section 20 of the mobile unit, it is again converted to the AF range and applied to an AF section 21. It is amplified here and applied to a loudspeaker 23. The speech signal of a user of the mobile unit is recorded by a microphone 24 and returned to the base unit 1 via AF section 21 and HF section 20. The speech of the mobile user is applied to the exchange interface module 13 via HF section 10 and AF section 11.

Memories 15 and 25 store ID codes. The base station further includes an ID code modulator 16, an ID code detector 17, and an evaluation circuit 18 which are appropriately coupled to the AF part 11 when ID code information is exchanged between the base station 1 and the handset 2. The coupling is done via switches 12 and 12b. The handset 2 further comprises an ID code modulator 26, an ID code detector 27, an evaluation circuit 28, and a control unit 29. Switches 21a and 22b, shown symbolically, are provided for lowering the AF signal to the loudspeaker 23 for sending the ID code.

Figure 3:
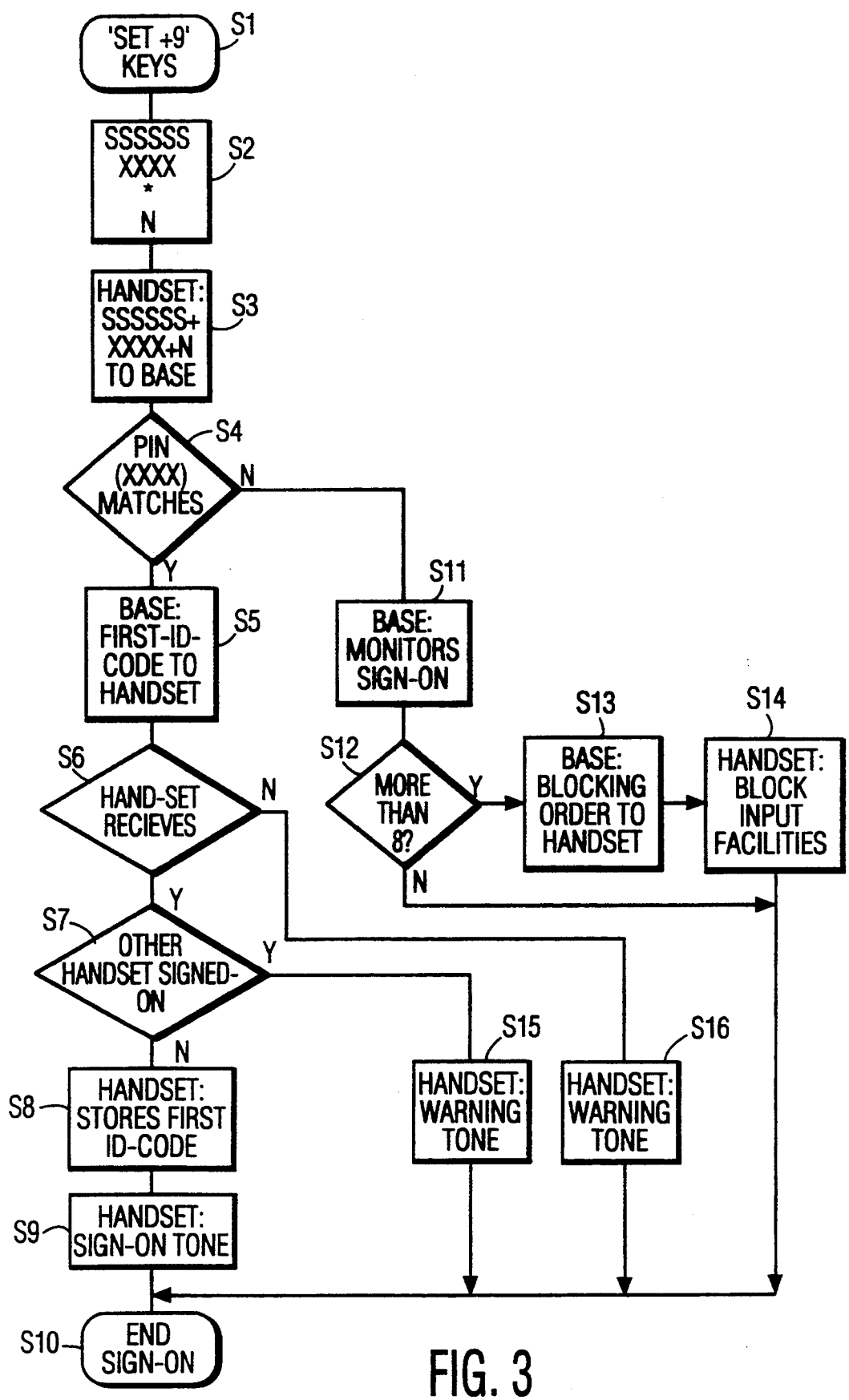
FIG. 3 shows a flow chart illustrating sign-on of handsets in the telecommunication system according to the present invention.

FIG. 3 shows a flow chart illustrating sign-on of handsets.

For signing on a new handset, first a combination of keys in the handset is to be depressed, which enables the start of a sign-on procedure. In the exemplary embodiment at S1 they are the "SET" keys and the FIG. 9. Then at S2 a six-figure system identification code SSSSSS is to be entered and after that a four-figure personal identification number XXXX. The system identification code is known to each purchaser of a base station, for example, by means of enclosed information. If, additionally, a personal identification number for signing on and signing off is provided, as is the case in this exemplary embodiment, this system identification code may be attached even in full view to the base station without a loss of reliability. Without the knowledge of the personal identification number, unauthorized manipulation is nevertheless largely precluded.

Depressing an acknowledge key, the "*" key in the exemplary embodiment, acknowledges the sign-on procedure. In the exemplary embodiment a one-figure number N which may be allocated to the handset may be depressed subsequent to the acknowledge key.

The handset at S3 now transmits by a free radio channel the entered system identification code SSSSSS, the personal identification number XXXX, and the handset number N of the handset. If the base station 1 with the uniquely issued system identification code SSSSSS is located within radio range of the handset, it recognizes on the basis of the second identification code a sign-on request directed to the base station. By evaluating the personal identification number XXXX at S4, it recognizes whether the sign-on request has been issued by a user authorized thereto. If this is the case, the base station 1 transmits S5 the identification code stored in the first base station 15 to the mobile station 2 by the established radio channel. The mobile station 2 receiving the first identification code over the selected radio channel stores this identification code in an electrically erasable memory 25B. In this manner the identification code is retained even if the handset experiences an electric power failure.

Simultaneously, the handset produces an acknowledge tone at S9, in the exemplary embodiment a continuous tone lasting 3 seconds, to inform the user of the successful sign-on attempt. If the handset does not receive an identification code within a predetermined time interval, either because the handset is located outside the radio range of the base station or because a non-matching personal identification number was dialled for signing on, the handset will produce a warning signal at S26. In the exemplary embodiment this warning signal consists of three successive pulse-like audio signals.

The base station at S11 monitors the number of attempts a handset makes to sign on with a false personal identification number. If in excess of eight consecutive unsuccessful sign-on attempts are made at S8, the base station sends a blocking order S13 to the handset. On the basis of this blocking order all the input facilities in the handset are blocked at S14. This blocking function may only be reset by a service engineer.

If, on the other hand, it is detected at S7 during the sign-on procedure that already another handset has signed on at the base station under the transmitted handset number, the base station will not send back its first identification code either. In this manner the user is again informed of the situation by means of a warning tone at S15. Such abortive attempts, however, are discarded for the blocking of the handset, because the correct personal identification number had each time been used.

A handset can be signed off in a similar fashion. The personal identification number then provides a safeguard against an unauthorized person's signing off of a handset. In the exemplary embodiment the procedure already described is carried out while the gate key "#" in lieu of the asterisk key "*" on the numerical keypad of the handset is to be depressed. In this case the reply of the base station is only necessary for an acknowledge tone which signals the successful signing off.

Figure 4:
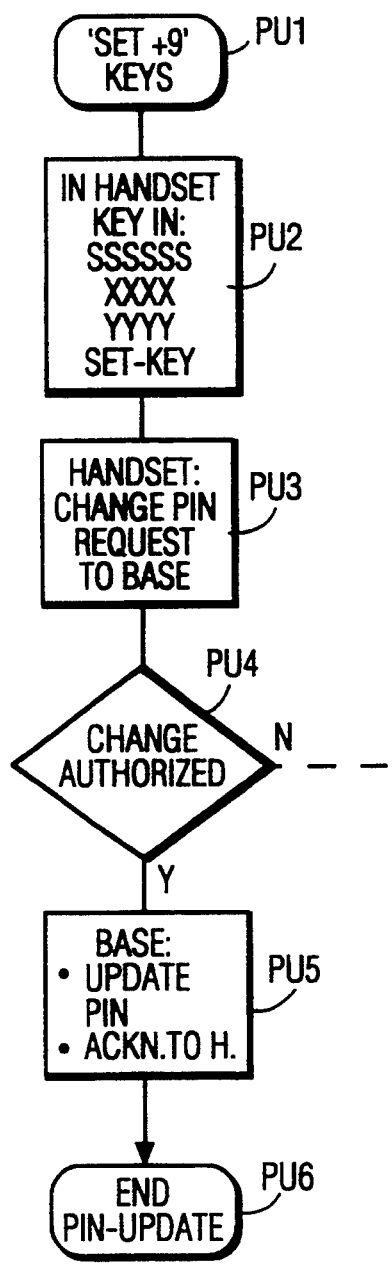
FIG. 4 shows a flow chart illustrating PIN-code update in a telecommunication system according to the present invention.

FIG. 4 shows a flow chart for updating the personal identification number. In the exemplary embodiment the personal identification number is changed by means of a handset. In the exemplary embodiment the personal identification numbers of base stations are set at a predetermined value e.g. 0000 during the manufacturing process. Especially in this case a change of the personal identification number is strongly advised. By depressing the key combination of "SET" and the FIG. 9 at PU1, the programming of the handset is introduced. Subsequently at PU2, the six-figure system identification code SSSSSS, the thus far valid personal identification number XXXX and a new four-figure personal identification number YYYY are to be entered. By depressing the "SET" key, the change of the personal identification number is terminated and the change request is transmitted at PU3 by a radio channel. The base station which recognizes the authorization for the change of the personal identification number on the basis of the system identification code and the correct thus far valid personal identification number at PU4, now writes in its memory the new personal identification number YYYY received in the message and sends back an acknowledge message to the user by the radio channel at PU5.

The handset number dialled during a sign-on procedure is stored in the handset. The handset may now be selectively responded to under this number, for example, in a private branch exchange constituted by cordless telephone sets. For this purpose, the messages used by a base station for setting up a conversation comprise a message portion in which an handset number may be transmitted. By comparing the handset number contained in the received messages with its own stored handset number, the handset can recognize a selective call addressed to this handset.

We claim:

1. In a telecommunication system comprising:
    a) at least one base station, said base station comprising:
        (i) means to communicate by a radio link,
        (ii) means to store a first and a second identification code,
        (iii) means to compare a received identification code with a stored identification code,
        (iv) means to set up a communication connection,
    b) at least one handset comprising:
        (i) means to communicate with the base station by the radio link,
        (ii) means to store a first and a second identification code,
        (iii) means to compare a received identification code with a stored identification code,
    the method of operating said system comprising the steps:
    (c) storing in said base station a first identification code associated with said handset,
    (d) storing in said base station a second identification code unique to said base station,
    (e) storing in said handset if known the first identification code,
    (f) establishing a first radio link connection between the base station and handset by an exchange of said first identification code, when the handset knows the second identification code stored in the base station, as an alternate step to step (f),
    (g) establishing a second radio link connection between the base station and handset by the handset transmitting to the base station the second identification code.

2. The telecommunication system as claimed in claim 1, further comprising the steps:
    (h) in response to receiving from the handset the second identification code, the base station then exchanging with the handset the first identification code.

3. The telecommunication system as claimed in claim 1, further comprising the steps:
    (h) in response to receiving from the handset the second identification code, the base station then transmitting to the handset for storage the first identification code.

4. The telecommunication system as claimed in claim 1, further comprising the steps:
    (i) when the handset has a stored first identification code, the alternate step (g) cannot be used to establish the second radio link connection and only step (f) is available for establishing a radio link connection.

5. The telecommunication system as claimed in claim 1, wherein the handset and base station each further comprises means for changing its stored first identification code, and wherein the second radio link connection is established by the handset also transmitting to the base station with the second identification code the changed first identification code for storage by the base station.

6. The telecommunication system as claimed in claim 1, further comprising the steps:
    (h) step (g) is carried out by also transmitting a handset number assigned to the handset.

7. A base station for use in a telecommunication system having at least one handset,
    said base station comprising:
        (i) means to communicate by a radio link,
        (ii) means to store a first and a second identification code,
        (iii) means to compare a received identification code with a stored identification code,
        (iv) means to set up a communication connection with said handset,
    the method of operating said base station comprising the steps:
    (a) storing in said base station a first identification code assigned to a handset,
    (b) storing in said base station a second identification code unique to said base station,
    (c) establishing a first radio link connection between the base station and handset by an exchange of said first identification code,
    (d) in response to receiving from the handset the second identification code, establishing a second radio link connection between the base station and handset by transmitting to the handset the first identification code.

8. A base station for use in a telecommunication system having at least one handset as claimed in claim 7, wherein the base station in response to receiving a changed identification code from the handset stores and substitutes the changed identification code for one of its stored identification codes.

9. A handset for use in a telecommunication system having at least one base station, said handset comprising:
 (i) means to communicate by a radio link,
 (ii) means to store a first and a second identification code,
 (iii) means to compare a received identification code with a stored identification code,
 (iv) means to set up a communication connection with said base station,
the method of operating said handset comprising the steps:

(a) storing in said handset if known a first identification code assigned to the handset,
 (b) storing in said handset if known a second identification code unique to said base station,
 (c) establishing a first radio link connection between the base station and handset by an exchange of said first identification code, when the handset knows the second identification code stored in the base station, as an alternate step to step (c),
 (d) establishing a second radio link connection between the base station and handset by transmitting to the base station the second identification code.

10. The handset of claim 9, wherein the handset comprises a keypad for entering a second identification code, and the further step of entering the second identification code is carried out prior to carrying out step (d).

* * * * *

UNITED STATES PATENT AND TRADEMARK OFFICE
CERTIFICATE OF CORRECTION

PATENT NO. : 5,448,764
DATED : September 5, 1995
INVENTOR(S) : Manfred Sondermann, et al It is certified that error appears in the above-indentified patent and that said Letters Patent is hereby corrected as shown below:

On the title page: Item [22] "Filed" change "Oct. 10, 1993" to -- March 10, 1993 --.

Signed and Sealed this

Second Day of January, 1996

*Attest:*

BRUCE LEHMAN

*Attesting Officer*     Commissioner of Patents and Trademarks